(12) United States Patent
Guitar et al.

(10) Patent No.: US 9,637,968 B2
(45) Date of Patent: May 2, 2017

(54) CENTER ROLLER ASSEMBLY FOR A VEHICLE SLIDE DOOR

(71) Applicant: Honda Motor Co., Ltd., Tokyo (JP)

(72) Inventors: James P. Guitar, Prospect, OH (US); Steven R. Thiele, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/729,365

(22) Filed: Jun. 3, 2015

(65) Prior Publication Data

US 2016/0356068 A1    Dec. 8, 2016

(51) Int. Cl.

| | | |
|---|---|---|
| *E05F 15/655* | (2015.01) | |
| *E05D 15/06* | (2006.01) | |
| *E05D 15/58* | (2006.01) | |
| *E05F 15/643* | (2015.01) | |
| *E05D 15/10* | (2006.01) | |
| *B60J 5/06* | (2006.01) | |
| *E05D 15/48* | (2006.01) | |

(52) U.S. Cl.
CPC ........ *E05F 15/655* (2015.01); *E05D 15/0621* (2013.01); *E05D 15/101* (2013.01); *E05D 15/581* (2013.01); *E05F 15/643* (2015.01); *B60J 5/06* (2013.01); *E05D 2015/1026* (2013.01); *E05D 2015/485* (2013.01)

(58) Field of Classification Search
USPC .......................................... 49/352; 74/502.6
See application file for complete search history.

(56) References Cited

U.S. PATENT DOCUMENTS

| | | | |
|---|---|---|---|
| 6,021,689 A * | 2/2000 | Moore | F16C 1/14 74/501.5 R |
| 6,155,630 A | 12/2000 | Fukumoto et al. | |
| 6,481,783 B1 * | 11/2002 | Rogers, Jr. | B60J 5/06 296/155 |
| 7,325,361 B2 * | 2/2008 | Rogers, Jr. | E05F 15/643 296/155 |
| 7,334,498 B2 | 2/2008 | Yokomori et al. | |

(Continued)

FOREIGN PATENT DOCUMENTS

| | | |
|---|---|---|
| JP | 2007270426 | 10/2007 |
| JP | 2008127830 | 6/2008 |

(Continued)

*Primary Examiner* — Katherine Mitchell
*Assistant Examiner* — Marcus Menezes
(74) *Attorney, Agent, or Firm* — Rankin, Hill & Clark LLP

(57) ABSTRACT

A center roller assembly for a vehicle slide door includes a support arm having a first end portion hingedly connected to the vehicle slide door and a second end portion. A roller unit includes a load roller rotatably connected to the second end portion by a load roller shaft and first and second guide rollers flanking the load roller and rotatably connected to the second end portion by first and second guide roller shafts. A first drive cable has a first attachment member secured to an end portion thereof and directly connected to the first guide roller shaft. A second drive cable has a second attachment member secured to an end portion thereof and directly connected to the second guide roller shaft. The first and second guide roller shafts are each configured to prevent disengagement of the first and second attachment members from the first and second guide roller shafts.

14 Claims, 8 Drawing Sheets

(56) References Cited

U.S. PATENT DOCUMENTS

| | | | |
|---|---|---|---|
| 7,347,025 B2* | 3/2008 | Fukumoto | B60J 5/06 296/155 |
| 7,669,367 B2* | 3/2010 | Shimura | B60J 5/06 296/155 |
| 8,387,310 B2 | 3/2013 | Robalo et al. | |
| 9,238,399 B2* | 1/2016 | Okuma | B60J 5/06 |
| 2006/0225358 A1* | 10/2006 | Haag | H02K 7/1166 49/360 |
| 2008/0302018 A1* | 12/2008 | Yamada | E05F 15/646 49/352 |
| 2015/0033503 A1* | 2/2015 | Yamada | B60J 5/06 16/91 |
| 2015/0135885 A1* | 5/2015 | Saarela | F16C 1/145 74/502.2 |
| 2015/0291013 A1* | 10/2015 | Okuma | B60J 5/06 16/91 |

FOREIGN PATENT DOCUMENTS

| | | |
|---|---|---|
| JP | 2010077716 | 4/2010 |
| KR | 100622728 | 9/2006 |
| WO | 2013129206 | 9/2013 |

* cited by examiner

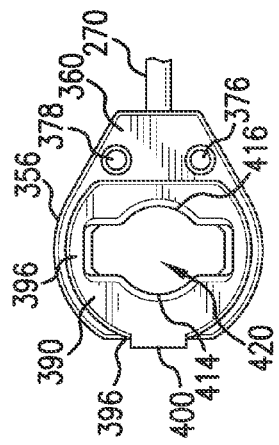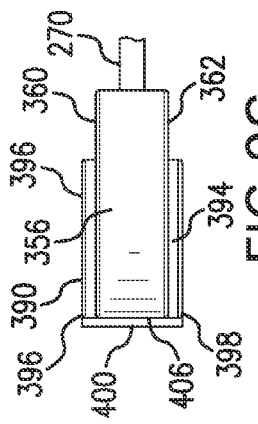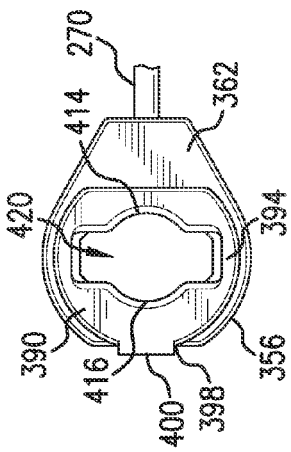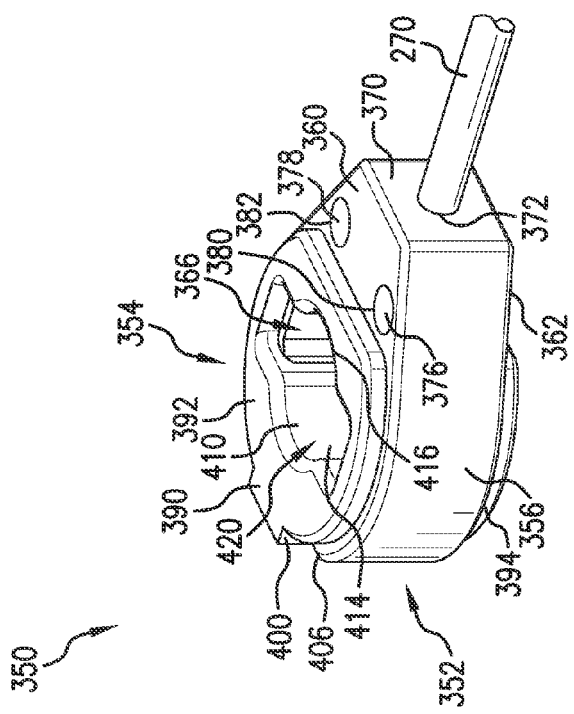

CENTER ROLLER ASSEMBLY FOR A VEHICLE SLIDE DOOR

BACKGROUND

A known center guide roller assembly includes a bracket having one end portion hinged to the slide door and an opposite end portion provided with a roller arrangement. The roller arrangement generally includes a support roller supported on a horizontally oriented rotational shaft and a pair of guide rollers flanking the support roller and supported on vertically oriented rotational shafts. The support roller is attached to or mounted at a bottom wall of a center rail in a rolling manner so as to support a load of the slide door that is supported by the center rail. The guide rollers are guided at an upper wall of the center rail so as to move the slide door by sliding along the center rail. Typically, separate holders for drive cable are positioned below the vertical rollers. The cable holders receive barrel shaped bushing members provided on end portions of the drive cables which are driven or reeled by a drive motor provided at the vehicle door. However, the use of the separate cable holders can increase the cost and packaging size of the known roller arrangement.

BRIEF DESCRIPTION

According to one aspect, a center roller assembly for a vehicle slide door comprises a support arm having a first end portion hingedly connected to the vehicle slide door and a second end portion. A roller unit is provided at the second end portion of the support arm. The roller unit includes a load roller rotatably connected to the second end portion by a load roller shaft and first and second guide rollers flanking the load roller and rotatably connected to the second end portion by respective first and second guide roller shafts. A first drive cable has a first attachment member secured to an end portion thereof. The first attachment member is directly connected to the first guide roller shaft. A second drive cable has a second attachment member secured to an end portion thereof. The second attachment member is directly connected to the second guide roller shaft. The first and second guide roller shafts are each configured to prevent disengagement of the first and second attachment members from the respective first and second guide roller shafts.

According to another aspect, a center roller assembly for a vehicle slide door comprises a support arm having a first end portion hingedly connected to the vehicle slide door and a second end portion. A roller unit is provided at the second end portion of the support arm. The roller unit includes a load roller rotatably connected to the second end portion by a load roller shaft and first and second guide rollers flanking the load roller and rotatably connected to the second end portion by respective first and second guide roller shafts. Each of the first and second guide roller shafts includes a first radially extending projection and a second radially extending projection axially spaced from the first projection. The second projection engaging the second end portion of the support arm. A first drive cable has a first attachment member secured to an end portion thereof. The first attachment member is positioned between the first and second projections of the first guide roller shaft. A second drive cable has a second attachment member secured to an end portion thereof. The second attachment member is positioned between the first and second projections of the second guide roller shaft.

According to yet another aspect, a center roller assembly for a vehicle slide door comprises a support arm having a first end portion hingedly connected to the vehicle slide door and a second end portion. A roller unit is provided at the second end portion of the support arm. The roller unit includes a load roller rotatably connected to the second end portion by a load roller shaft and first and second guide rollers flanking the load roller and rotatably connected to the second end portion by respective first and second guide roller shafts. Each of the first and second guide roller shafts includes a first radially extending projection. A first drive cable has a first attachment member secured to an end portion thereof. The first attachment member is directly connected to the first guide roller shaft. A second drive cable has a second attachment member secured to an end portion thereof. The second attachment member is directly connected to the second guide roller shaft. The first attachment member includes a first part secured to the end portion of the first drive cable and a second part secured to the first part. The first part includes a first body having a first opening extending therethough. The first opening is dimensioned to slidably receive the first guide roller shaft. The second part includes a second body. A portion of the second body at least partially lines the first opening and defines a second opening shaped to conform to that portion of the first guide roller shaft having the first projection. The second attachment member includes a first part secured to the end portion of the second cable and a second part secured to the first part. The first and second parts of the second attachment member are identical to the first and second parts of the first attachment member. The first projection of each of the first and second guide roller shafts is adapted to prevent disengagement of the first and second attachment members from the respective first and second guide roller shafts.

BRIEF DESCRIPTION OF THE DRAWINGS

FIG. 9A is a perspective view of an end portion of a drive cable for the roller unit having an exemplary attachment member including a first part and a second part according to another aspect of the present disclosure.

FIG. 9B is a top view of the drive cable and attachment member of FIG. 9A.

FIG. 9C is a side view of the drive cable and attachment member of FIG. 9A.

FIG. 9D is a bottom view of the drive cable and attachment member of FIG. 9A.

DETAILED DESCRIPTION

It should, of course, be understood that the description and drawings herein are merely illustrative and that various modifications and changes can be made in the structures disclosed without departing from the present disclosure. In general, the figures of the exemplary center roller assembly for a vehicle slide door are not to scale. As used herein, lateral directions are transverse across the vehicle, i.e., left and right directions. Likewise, longitudinal directions refer to forward and rearward directions of vehicle travel, and the vertical directions relate to elevation, i.e., upward and downward directions. It will also be appreciated that the various identified components of the exemplary center roller assembly disclosed herein are merely terms of art that may vary from one manufacturer to another and should not be deemed to limit the present disclosure.

Figure 1:
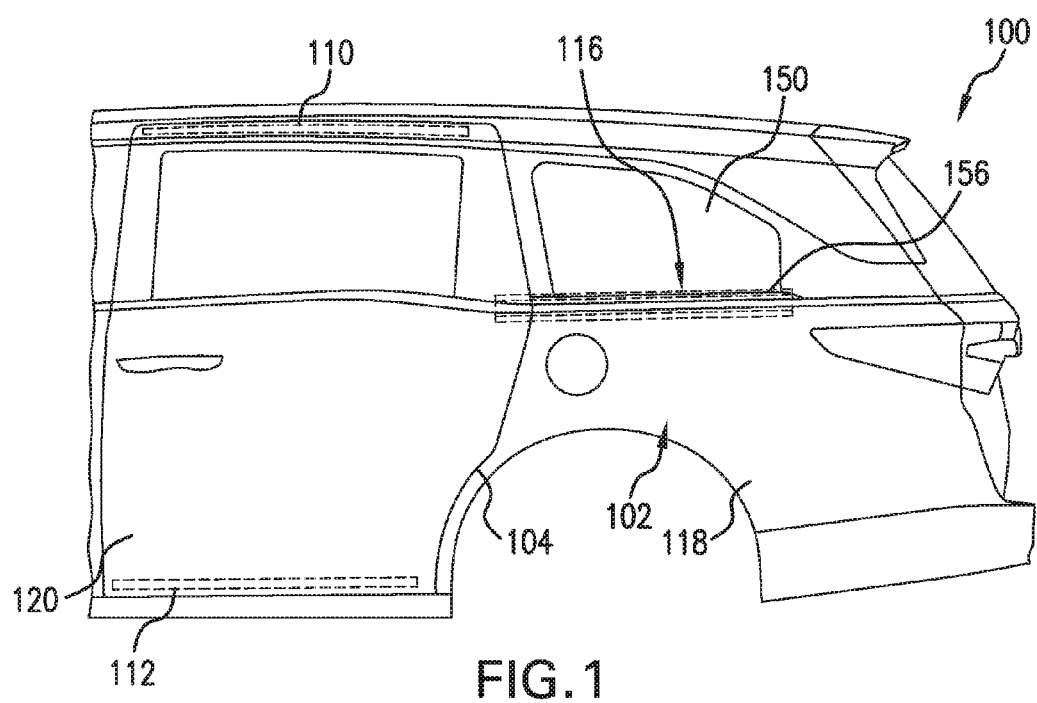
FIG. 1 is a side view of a vehicle having a slide door.

Referring now to the drawings, wherein like numerals refer to like parts throughout the several views, FIG. 1 schematically illustrates a side part of a vehicle 100 including a vehicle body 102 having a door opening 104 formed at a lateral side portion of the vehicle body. An upper slide rail 110 and a lower slide rail 112 are provided respectively at an upper edge and a lower edge of the door opening 104. Each slide rail 110, 112 extends in a longitudinal direction of the vehicle and is fixed to the vehicle body 102. In addition, a center slide rail 116 that extends in the longitudinal direction of the vehicle 100 and that serves as a guide rail is provided at a quarter panel 118 arranged at a rear lateral side of the door opening 104. The upper rail 110, the lower rail 112, and the center rail 116 support a slide door 120 by means of upper and lower guide roller assemblies (not shown) slidably connected in the upper and lower guide rails, respectively. A center roller assembly 124 is slidably connected to the center rail 116 (see FIG. 2). As is well known in the art, the center roller assembly 124 can be operatively connected to a drive mechanism (not shown) for opening and closing the door opening 104 by moving the slide door 120 in the longitudinal direction of the vehicle 100 via the upper, lower and center roller assemblies.

Figure 2:
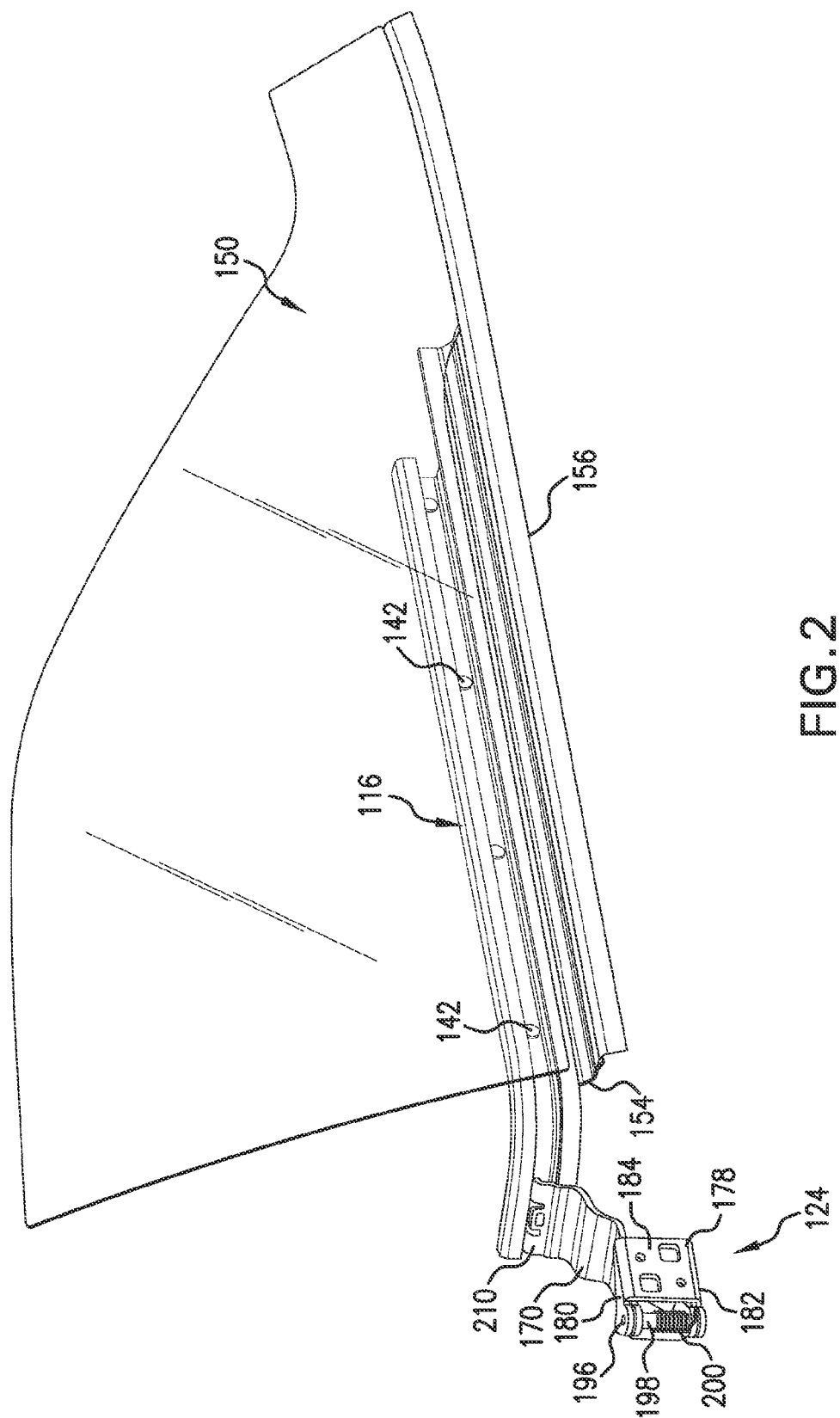
FIG. 2 is a partial perspective view of a center guide rail and a support arm for the slide door of FIG. 1.
Figure 3:
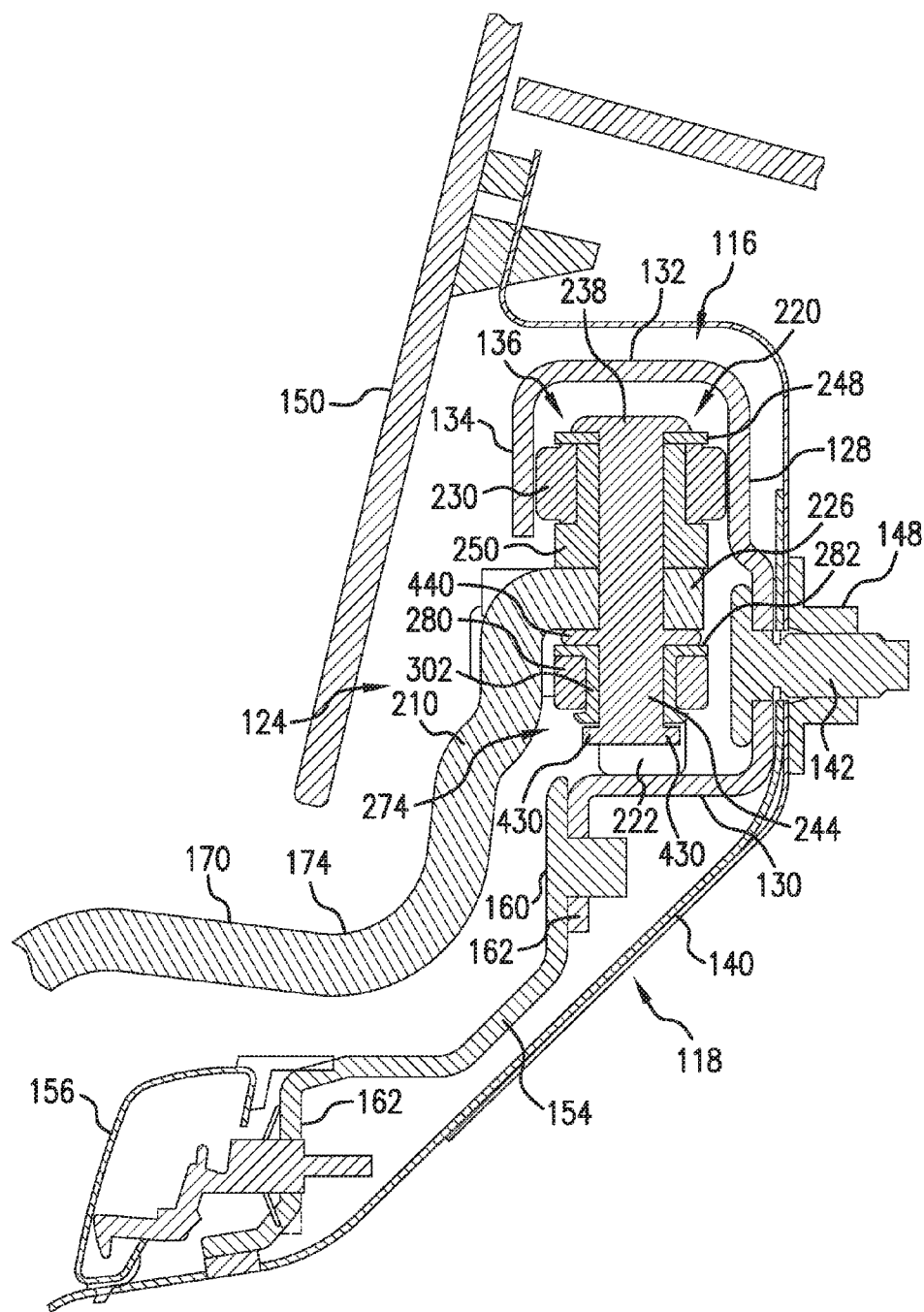
FIG. 3 is a partial cross-sectional view of the center guide rail and the support arm of the vehicle of FIG. 1.

FIGS. 2 and 3 depict the center rail 116 and the center roller assembly 124 slidably connected thereto. As shown, the center rail 116 includes a side wall 128, a bottom wall 130 and a top wall 132, which is arranged to overlap the bottom wall 130 in a vertical direction of the vehicle 100 and is connected thereto via the side wall 128. The top wall 132 includes a downwardly extending flange 134 spaced from and opposing the side wall 128, wherein the side wall 128, top wall 132 and the flange 134 together define an elongate channel 136. The center rail 116 is secured to a panel member 140 of the quarter panel 118 via fastening devices, such as bolt or weld stud 142, which extends through aligned openings in the side wall 128 and panel member 140, and nut 148 threaded onto an end of the bolt 142. However, it should be appreciated that the fastening devices may be any type of mechanical fastening device commonly known in the art. Further depicted in FIG. 3 is a glass panel 150 adhered to the panel member 140 and sized to at least partially conceal the center rail 116, a center rail cover 154 and a molding 156. The center rail cover 154 has one end portion 158 secured to a downwardly extending flange 160 of the bottom wall 130 and an opposite end portion 162 adhered to the panel member 140. As shown, the molding 156 can be secured to the end portion 162.

Figure 4A:
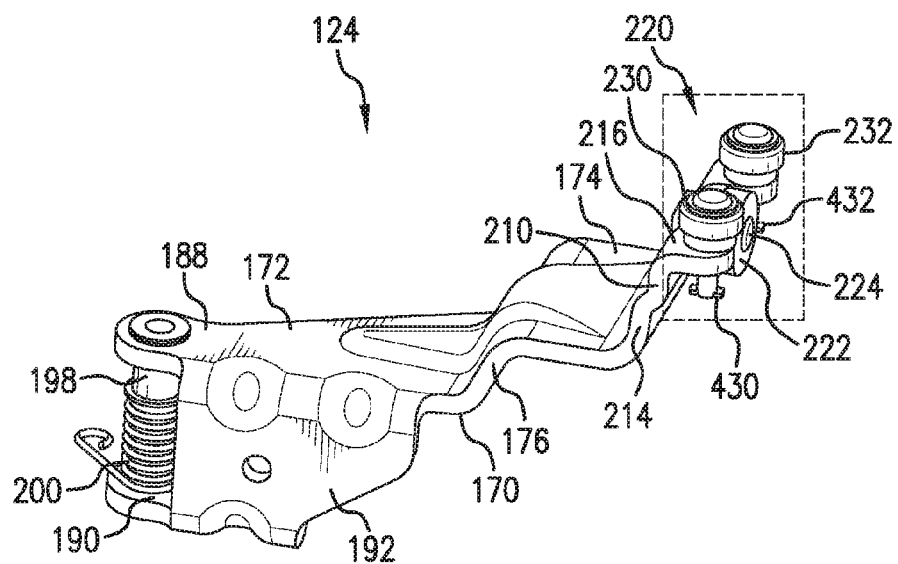
FIG. 4A is a perspective view of the support arm of FIG. 2.

As illustrated in FIGS. 2, 3 and 4A, the center roller assembly 124 comprises a support arm 170 having a first end portion 172 and a second end portion 174, which is offset in a vertical direction from the first end portion by a stepped portion 176. The first end portion 172 is hingedly connected to the vehicle slide door 120 via a hinge bracket 178, which serves as a support member. The hinge bracket 178 can be substantially formed into a U-shape including a pair of door support wall portions 180 and 182 (i.e., an upper door support wall portion 180 and a lower door support wall portion 182 arranged to overlap each other in the vertical direction of the vehicle 100) and a door connecting wall portion 184 that connects the pair of door support wall portions 180, 182 to each other. The hinge bracket 178 is mechanically fixed to the slide door 120 via the door connecting wall portion 184.

As best illustrated in FIGS. 2 and 4A (which shows the support arm 170 without the hinge bracket 178 connected thereto), the support arm 170 includes an upper wall portion 188 and a lower wall portion 190 arranged to overlap each other in the vertical direction of the vehicle 100. The support arm 170 also includes a connecting wall portion 192 that connects the upper and lower wall portions 188, 190 to each other. The support arm 170 is rotatably connected to the hinge bracket 178 via a hinge pin 196 which extends in the vertical direction through the support wall portions 180, 182 of the hinge bracket 178 and through the upper and lower wall portions 188, 190 of the support arm 170. As best illustrated in FIG. 4A, the hinge pin 196 includes a guide portion 198 having substantially a column shape and extending vertically between the upper and lower wall portions 188, 190. One end of a torsion spring 200 provided on the guide portion 198 is in pressure contact with the door connecting wall portion 184 of the hinge bracket 178 while the other end of the torsion spring 200 is in pressure contact with the support arm connecting wall portion 192.

Figure 4B:
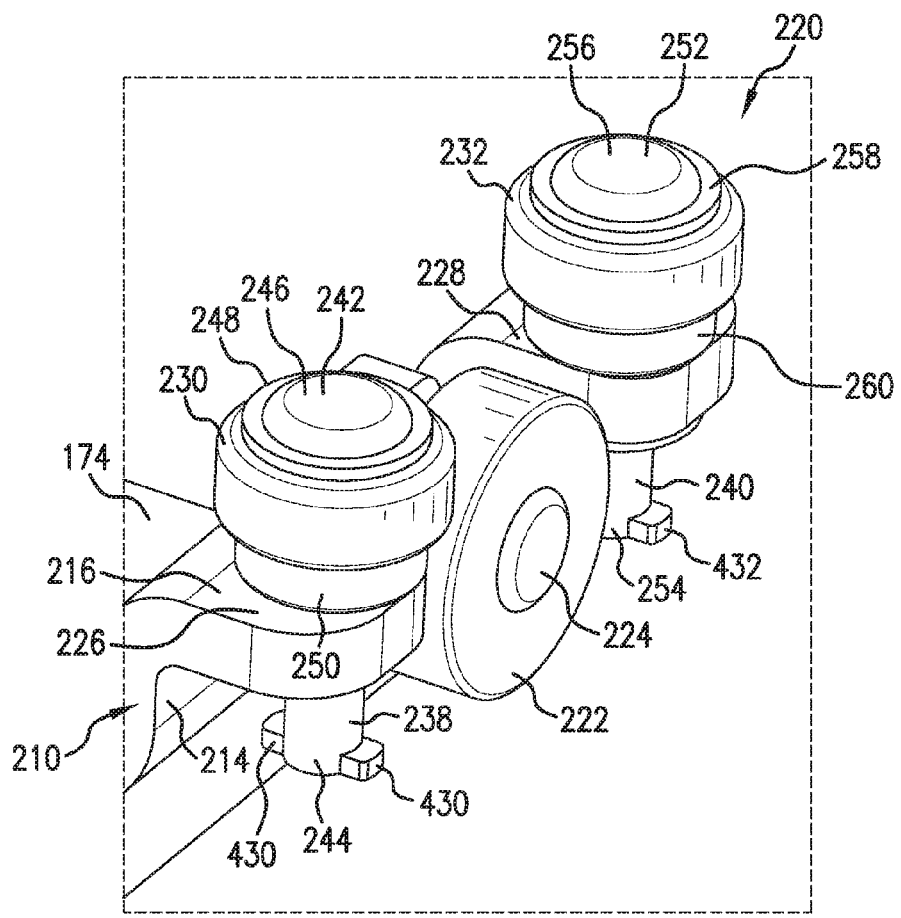
FIG. 4B is an enlarged perspective view of an exemplary roller unit of the support arm of FIG. 4A.

As illustrated in FIGS. 3, 4A and 4B, the support arm 170 further includes a roller unit support wall portion 210 located at the second end portion 174. The roller unit support wall portion 210 can be substantially formed into an L-shape including a first section 214 extending upwardly from the upper arm support wall portion 188 and facing the center rail 116 and a second section 216 extending substantially perpendicular from the first section 214. A roller unit 220 is provided at the second end portion 174 of the support arm 170. The roller unit 220 includes a load roller 222 rotatably connected to the roller support wall portion 210 by a load roller rotational pin or shaft 224. The rotational shaft 224 extends through the first section 214 of the roller support wall portion 210 in the horizontal direction (i.e., in a thickness direction thereof). The load roller 222 is attached to or mounted at the bottom wall 130 of the center rail 116 in a rolling manner so as to support a load of the slide door 120 that is supported by the center rail 116 (and the vehicle body 102).

The second section 216 of the roller support wall portion 210 is defined by a pair of spaced apart supports 226, 228 that sandwich the load roller 222 and rotational shaft 224 from both sides in the horizontal direction. First and second guide rollers 230, 232 flank the load roller 222 and are rotatably connected to respective supports 226, 228 of the second section 216 by respective first and second guide roller rotational pins or shafts 238, 240. Particularly, in the depicted embodiment of FIG. 4B, the first rotational shaft 238 extends through the support 226 and has a first end portion 242 located above the support 226 and a second end portion 244 located below the support 226. The first end portion 242 includes an enlarged head 246 and mounted on the first end portion 242 between the head 246 and the support 226 is a washer 248, the first guide roller 230 and a collar 250 for supporting the first guide roller 230. Similarly, the second rotational shaft 240 extends through the support 228 and has a first end portion 252 located above the support 228 and a second end portion 254 located below the support 228. The first end portion 252 includes an enlarged head 256 and mounted on the first end portion 252 between the head 256 and the support 228 is a washer 258, the second guide roller 232 and a collar 260 for supporting the second guide roller 232. With reference back to FIG. 3, the first and second guide rollers 230, 232 are guided in the channel 136 of the center rail 116 so as to move the slide door 120 by sliding along the center rail 116. The roller unit 220 guided by the center rail 116 allows the longitudinal movement of the slide door 120.

Figure 5A:
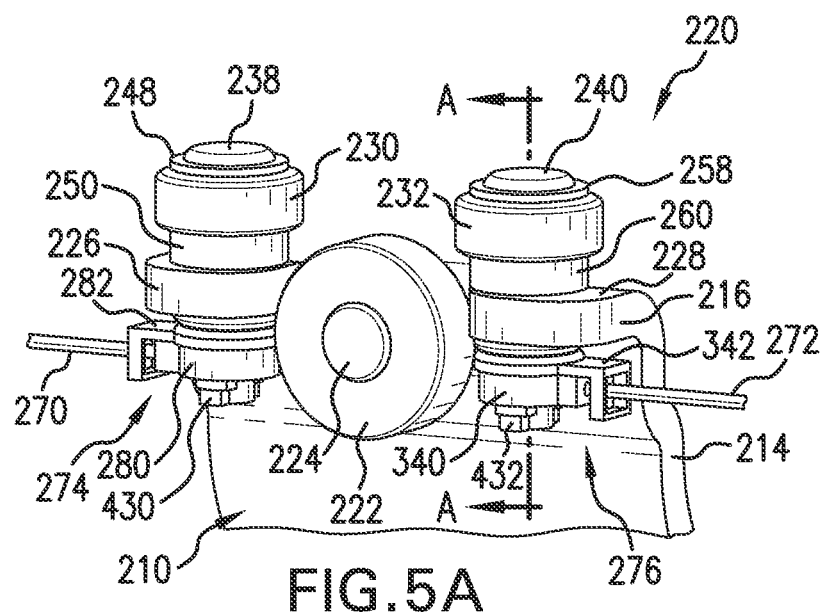
FIG. 5A is another perspective view of the roller unit of the support arm of FIG. 4A.
Figure 5B:
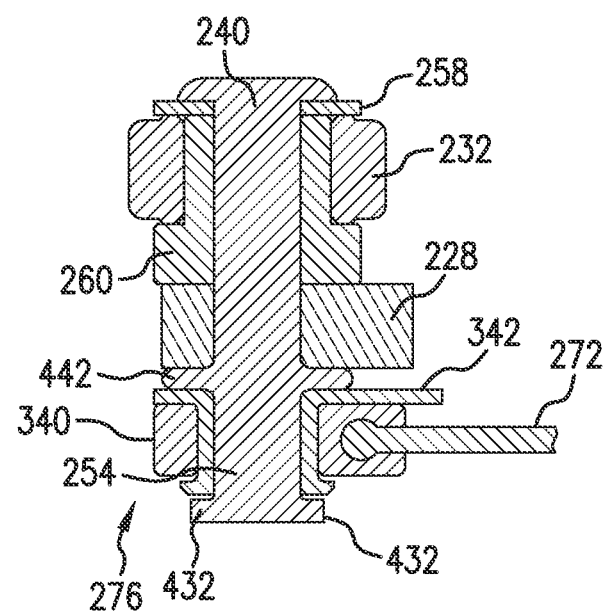
FIG. 5B is a cross-sectional view of the roller unit taken along line A-A of FIG. 5A.

As is well known, a drive mechanism (not shown) for moving the slide door 120 is operably connected to the roller unit 220 located on the support arm 170 by first and second drive cables 270, 272. The drive mechanism generally includes a drive motor (not shown) and a drum (not shown) rotatably driven by the drive motor. A first drive cable 270 and a second drive cable 272 are wound around the drum and are selectively reeled in and out by the drive mechanism. Each of the first and second drive cables 270, 272 are routed from the drive mechanism and are directly secured to the respective first and second guide roller rotational shafts 238, 240 of the roller unit 220. Particularly, as depicted in FIGS. 3, 5A and 5B, the first drive cable 270 has a first attachment member 274 secured to an end portion thereof, the first attachment member 274 being directly connected to the first guide roller shaft 238, and the second drive cable 272 has a second attachment member 276 secured to an end portion thereof, the second attachment member 276 being directly connected to the second guide roller shaft 240.

Figure 6:
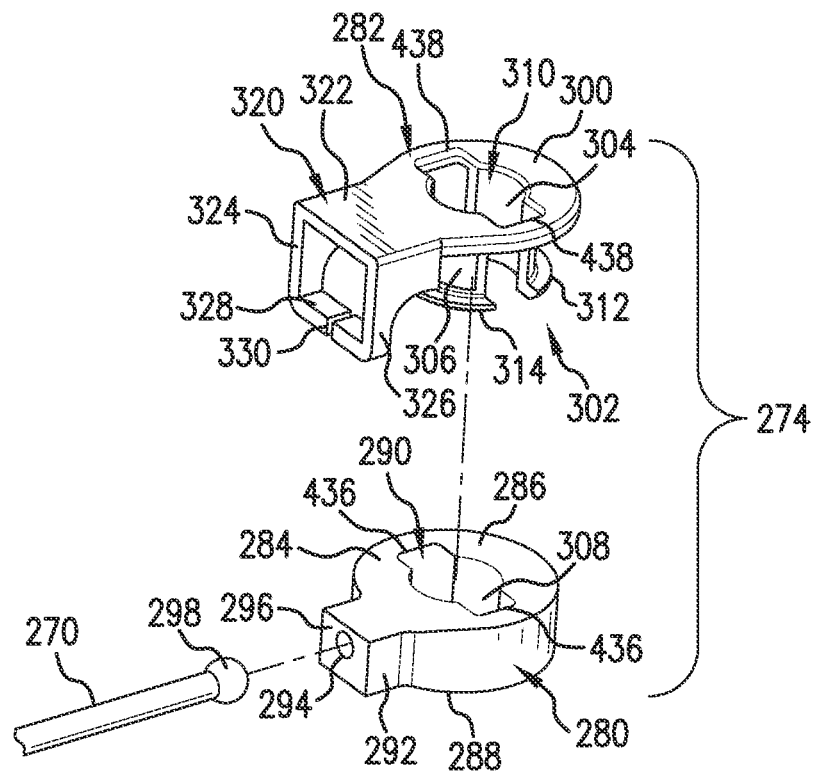
FIG. 6 is an exploded view of a drive cable for the roller unit, the drive cable having an exemplary attachment member including a first part and a second part according to one aspect of the present disclosure.
Figure 7:
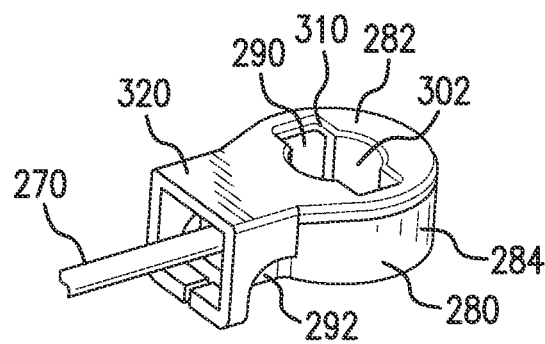
FIG. 7 is a perspective view of the drive cable of FIG. 6 having the attachment member secured to an end portion thereof

With reference to FIGS. 6 and 7, and according to one aspect, the first attachment member 274 includes a first part 280 secured to the end portion of the first drive cable 270 and a second part 282 (i.e., a bushing) secured to the first part 280. The first part 282, which can be generally ring-shaped, includes a first body 284 having opposite substantially planar surfaces 286, 288. A first opening 290 extends through the first body 284. The first opening 290 is dimensioned and shaped to slidably receive the second end portion 244 of the first guide roller shaft 238. A protrusion 292 projects from the first body 284 and has an opening 294 located on a substantially planar side surface 296 for receiving the end portion of the first drive cable 270. As depicted, the end portion of the first drive cable 270 can be provided with a bulbous head 298 which when positioned in the opening 294 fixedly secures the end portion of the first drive cable 270 to the first part 280 of the first attachment member 274.

The second part 282 of the first attachment member 274 includes a second body 300, a portion of the second body 300 being received in and at least partially lines the first opening 290. In the depicted embodiment, that portion of the second body 300 is a connecting member 302. According to one aspect, the connecting member 302 can be defined by a first wall section 304 and a second wall section 306 spaced from the first wall section. Each of the first and second wall sections 304, 306 is received in the first opening 290 of the first part 280, which secures the second part 282 to the first part 280. According to one aspect, the second part 282 can be overmolded onto the first part 280; although, that manner of securing the first and second parts is not required. Each of the first and second wall sections 304, 306 has an inner surface shaped to at least partially conform to an outer surface of the second end portion 244 of the first guide roller shaft 238 (FIG. 3) and an outer surface shaped to at least partially conform to an inner wall 308 of the first body 284 that defines the first opening 290 (FIG. 7). Once properly positioned in the first opening 290, the first and second wall sections 304, 306 together at least partially define a second opening 310 dimensioned and shaped to slidably receive the second end portion 244 of the first guide roller shaft 238. In the assembled condition of the first attachment member 274, flanges 312, 314 can be provided on the respective first and second wall sections 304, 306 for engaging the surface 288 of the first body 284.

Figure 8A:
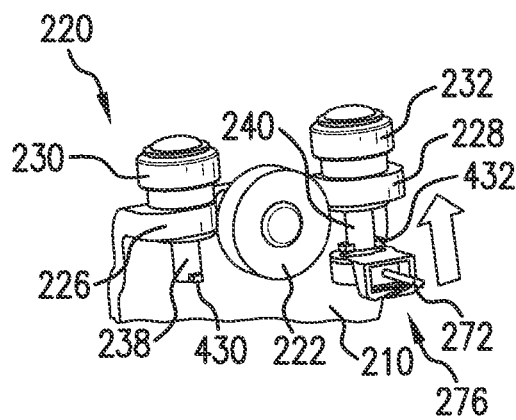
FIGS. 8A-8D illustrate the connection of the drive cable to a guide roller shaft of the exemplary roller unit.

The second part 282 further includes a housing 320 extending from the second body 300. The housing 320, which can be generally rectangular shaped, is defined by a top wall 322 of the second body 300, a pair of spaced side walls 324, 326 and a bottom wall 328. The bottom wall 328 includes a slot 330. According to one aspect, as depicted in FIGS. 6 and 7, the slot 330 extends substantially vertically or straight through the bottom wall 328. According to another aspect, as depicted in FIGS. 8A and 8C, the slot can extend angularly through the bottom wall, which requires the attachment member to rotate ninety degrees for the drive cable end portion to move through the slot. In the assembled condition of the first attachment member 274, the housing 320 receives the protrusion 292 of the first body 284 (FIG. 7), the slot 330 receiving the end portion of the first drive cable 270 thereby allowing the first drive cable to extend into the housing 320.

With reference to FIGS. 5A and 5B, the second attachment member 276 includes a first part 340 secured to the end portion of the second drive cable 272 and a second part 342 (i.e., a bushing) secured to the first part 340. In the illustrated embodiment, the first and second parts 340, 342 of the second attachment member 276 are identical to the first and second parts 280, 282 of the first attachment member 274. Therefore, further description of the features of the first and second parts 340, 342 of the second attachment member 276 will be omitted for conciseness.

FIGS. 9A-9D depict an alternate embodiment of at least one of the first attachment member and second attachment member. By way of example, a first attachment member 350 includes a first part 352 secured to the end portion of the first drive cable 270 and a second part 354 secured to the first part 352. The first part 352, which again can be generally ring-shaped, includes a first body 356 having opposite substantially planar surfaces 360, 362. A first opening 366 extends through the first body 356. The first opening 366 is dimensioned and shaped to slidably receive the second end portion 244 of the first guide roller shaft 238. A substantially planar first side surface 370 of the first body 356 has an opening 372 for receiving the end portion of the first drive cable 270. As depicted, the end portion of the first drive cable 270 can be fixed within the first body 356 by a pair of pins 376, 378 secured in respective openings 380, 382 located in the surface 360 of the first body 356.

The second part 354 of the first attachment member 350 includes a second body 390 having a first wall portion 392 and a second wall portion 394 spaced from and overlapping the first wall portion 392. Peripheral edge portions 396, 398 of the respective first and second wall portions 392, 394 are connected by a first connecting member 400 i.e. third wall portion As illustrated, the spacing between the first and second wall portions 392, 394 is approximately equal to a thickness of the first body 356 so that when assembled the first wall portion 392 is in direct contact with the surface 360, the second wall portion 394 is in direct contact with the surface 362, and the first connecting member 400 opposes a substantially planar second side surface 406 of the first body 356.

Similar to the first engagement member 274, a portion of the second body 390 is received in and at least partially lines the first opening 366. In the depicted embodiment, that portion of the second body 390 is a second connecting member 410, which also interconnects the first and second wall portions 392, 394. According to one aspect, the second connecting member 410 can be defined by a first wall section 414 and a second wall section 416 spaced from the first wall section. Each of the first and second wall sections 414, 416 is received in the first opening 366 of the first part 352. Again, to fixedly secure the first and second parts, the second part 354 can be overmolded onto the first part 352; although, that is not required. Each of the first and second wall sections 414, 416 has an inner surface shaped to at least partially conform to an outer surface of the second end portion 244 of the first guide roller shaft 238 and an outer surface shaped to at least partially conform to an inner wall of the first body 356 that defines the first opening 366. The first and second wall sections 414, 416 together at least partially define a second opening 420 dimensioned and shaped to slidably receive the second end portion 244 of the first guide roller shaft 238.

With reference back to FIGS. 3-5B, the first and second guide roller shafts 238, 240 are each configured to prevent disengagement of the first and second attachment members 274, 276 from the respective first and second guide roller shafts. Particularly, during assembly, the first and second attachment members 274, 276 are adapted to move axially unrestricted over the respective first and second guide roller shafts 238, 240 in a first orientation of the first and second attachment members 274, 276 relative to axes of the respective first and second guide roller shafts 238, 240. Once properly positioned on the first and second guide roller shafts 238, 240, the first and second attachment members 274, 276 can be move to a second orientation relative to axes of the respective first and second guide roller shafts 238, 240. The first and second attachment members 274, 276 are prevented from moving axially off the respective first and second guide roller shafts 238, 240 in the second orientation. According to one aspect, the second orientation is angularly offset from the first orientation.

To this end, according to one aspect, the second end portion 244, 254 of each of the respective first and second guide roller shafts 238, 240 includes as least one radially extending first projection 430, 432. With particular attention to the first attachment member 274, at least the second opening 310 of the second part 282 is shaped to receive the first projection 430. In the depicted embodiment of FIG. 6, each of the first and second openings 290, 310 of the first and second parts 280, 282 are shaped to receive the first projection 430. Specifically, the inner surface 308 of the first body 284 that defines the first opening 290 further defines a keyway 436 dimensioned to receive the first projection 430. The second opening 310 includes a corresponding keyway 438. As shown, the keyway 438 is only provided on the top wall 322, and the spacing between the first and second wall sections 304, 306 of the connecting member 302 (which depend from the top wall 322) allow for passage of the first projection 430 through the connecting member 302. According to another aspect, the second end portion 244, 254 of each of the first and second guide roller shafts 238, 240 includes circumferentially spaced, radially extending first projections 430, 432. And the first opening 290 and the second opening 310 each includes a pair of corresponding keyways 436, 438. It should be appreciated that the second attachment member 276 is configured similar to the first attachment member 274.

With continued reference to FIGS. 3 and 5B, each of the first and second guide roller shafts 238, 240 can include a respective second radially extending projection 440, 442 axially spaced from the at least one first projection 430, 432. Each second projection 440, 442 can extend circumferentially around its respective guide roller shaft; although this is not required. In the assembled condition, the second projection 440 engages the support 226 of the second section 210 of the roller unit support wall portion 210, and the first attachment member 274 is positioned between the first and second projections 430, 440 of the first guide roller shaft 238. Similarly, the second projection 442 engages the support 228 of the second section 210 of the roller unit support wall portion 210, and the second attachment member 276 is positioned between the first and second projections 432, 442 of the second guide roller shaft 240.

As indicated previously, the first and second attachment members 274, 276 are adapted to move axially unrestricted over the first projection 430, 432 of the respective first and second guide roller shafts 238, 240 in a first orientation of the first and second attachment members 274, 276 relative to axes of the respective first and second guide roller shafts. The first projection 430, 432 of the respective first and second guide roller shafts 238, 240 prevent the first and second attachment members 274, 276 from moving axially off the respective first and second guide roller shafts 238, 240 in a second orientation of the first and second attachment members 274, 276 relative to the axes of the respective first and second guide roller shafts 238, 240.

Figure 8B:
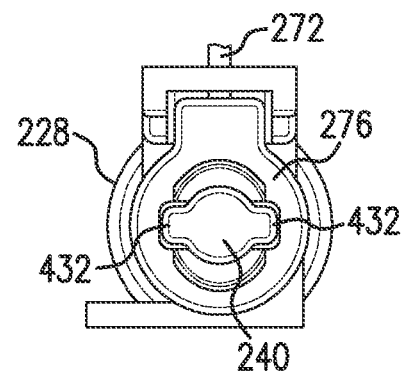
Figure 8C:
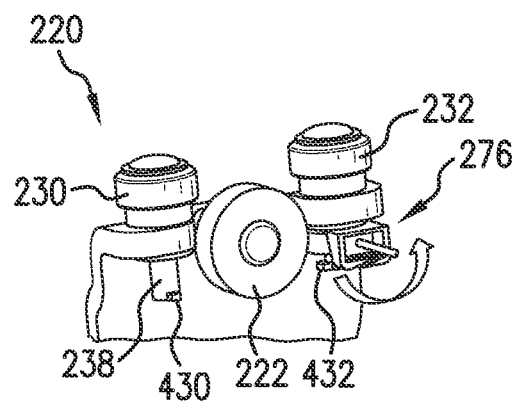
Figure 8D:
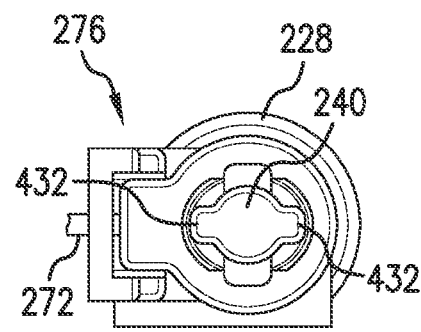

FIGS. 8A-8D illustrate this feature of the present disclosure. In FIG. 8A, the second attachment member 276 is in the first orientation, positioned beneath the second guide roller shaft 240 with the keyways of the first and second openings of the second attachment member 276 aligned with the first projections 432. In FIG. 8B, the second attachment member 276 is slid axially onto the second end 254 of the second guide roller shaft 240, the second end portion 254 extending through the second attachment member 276. In FIG. 8C, the second attachment member 276 is being moved to the second orientation relative to the axis of the second guide roller shaft 240. FIG. 8D shown the second attachment member 276 in the second orientation, the keyways of the second attachment member 276 being angularly offset from the first projections 432, thereby preventing the second attachment member 276 from moving axially off the second guide roller shaft 240.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A center roller assembly for a vehicle slide door comprising:
   a support arm having a first end portion hingedly connected to the vehicle slide door and a second end portion;
   a roller unit provided at the second end portion of the support arm, the roller unit including a load roller rotatably connected to the second end portion by a load roller shaft and first and second guide rollers flanking the load roller and rotatably connected to the second end portion by respective first and second guide roller shafts;

a first drive cable having a first attachment member secured to an end portion thereof, the first attachment member being directly connected to the first guide roller shaft, the first attachment member including a first part secured to the end portion of the first cable and a second part nonremovably secured to an outer surface of the first part, the first part including a first body having an outer side surface and an inner side surface defining a first opening extending therethough, the first opening dimensioned to slidably receive the first guide roller shaft;

the second part of the first attachment member includes a second body, the second body including:

a first wall, a second wall spaced from and overlapping the first wall, a third wall directly connecting the first and second walls, and a connecting member directly connecting the first and second walls, wherein when assembled the first and second walls are in direct contact with respective upper and lower outer surfaces of the first body, the third wall is in direct contact with the outer side surface of the first body, and the connecting member is received in the first opening of the first body; and a second drive cable having a second attachment member secured to an end portion thereof, the second attachment member being directly connected to the second guide roller shaft, wherein the first and second parts of the first attachment member are configured to prevent disengagement of the first attachment member from the first guide roller shaft.

2. The center roller assembly of claim 1, wherein the connecting member includes a second opening dimensioned to slidably receive the first guide roller shaft.

3. The center roller assembly of claim 2, wherein the connecting member including first and second spaced wall sections, each of the first and second wall sections being received in the first opening of the first part and in direct contact with the inner side surface of the first body to further secure the second part to the first part.

4. The center roller assembly of claim 1, wherein the second attachment member includes a first part secured to the end portion of the second cable and a second part secured to the first part, the first and second parts of the second attachment member being identical to the first and second parts of the first attachment member.

5. The center roller assembly of claim 4, wherein the first part of each first and second attachment member is generally ring-shaped and the second part of each first and second attachment member is an overmolded second part that is overmolded onto the first part.

6. The center roller assembly of claim 4, wherein end portions of the first and second guide roller shafts include as least one radially extending projection, and the connecting member of the second part of the first attachment member and a connecting member of the second part of the second attachment member are shaped to at least partially conform to the end portions of the first and second guide roller shafts.

7. The center roller assembly of claim 1, wherein an end portion of the first drive cable is fixed within the first body of the first part by at least one pin secured in at least one opening located in the first body.

8. The center roller assembly of claim 1, wherein the second body of the second part is configured to sandwich from above and below a majority of the first body of the first part.

9. A center roller assembly for a vehicle slide door comprising:

a support arm having a first end portion hingedly connected to the vehicle slide door and a second end portion;

a roller unit provided at the second end portion of the support arm, the roller unit including a load roller rotatably connected to the second end portion by a load roller shaft and first and second guide rollers flanking the load roller and rotatably connected to the second end portion by respective first and second guide roller shafts, each of the first and second guide roller shafts including an end portion having a radially extending projection; and a first drive cable having a first attachment member secured to an end portion thereof, and a second drive cable having a second attachment member secured to an end portion thereof, wherein the first attachment member includes a first part secured to the end portion of the first cable and an overmolded second part that is overmolded onto an outer surface of the first part so that the second part is nonremovably secured to the first part, the first part includes a first body having a first opening dimensioned to slidably receive the end portion of the first guide roller shaft, and the second part of the first attachment member includes a second body, a portion of the second body received in and at least partially lining the first opening, wherein the portion of the second body is a connecting member including first and second spaced wall sections, and wherein the second body includes a first wall and a second wall spaced from and overlapping the first wall, the connecting member interconnecting the first and second walls.

10. The center roller assembly of claim 9, wherein the first opening has a keyway for the projection of the first guide roller shaft and the first and second wall sections are configured to flank the keyway.

11. The center roller assembly of claim 9, wherein edge portions of the respective first and second walls are connected by a third wall directly contacting the outer surface of the first part.

12. The center roller assembly of claim 9, wherein the second attachment member includes a first part secured to the end portion of the second cable and an overmolded second part that is overmolded onto the first part of the second attachment member, the first and second parts of the second attachment member being identical to the first and second parts of the first attachment member.

13. The center roller assembly of claim 12, wherein the first and second attachment members are adapted to move axially unrestricted over the respective first and second guide roller shafts in a first orientation of the first and second attachment members relative to axes of the respective first and second guide roller shafts, and wherein the first and second attachment members are adapted to prevent axial movement off the respective first and second guide roller shafts in a second orientation of the first and second attachment members relative to the axes of the respective first and second guide roller shafts.

14. The center roller assembly of claim 13, wherein the second orientation is angularly offset from the first orientation.

\* \* \* \* \*